United States Patent [19]

Bianco

[11] 4,263,503

[45] Apr. 21, 1981

[54] BAR CODE LABEL PROTECTION DEVICE

[76] Inventor: James S. Bianco, 217 Brainard Rd., Enfield, Conn. 06082

[21] Appl. No.: 78,785

[22] Filed: Sep. 25, 1979

[51] Int. Cl.³ .................. G06K 19/00; G06K 21/06
[52] U.S. Cl. .................................. 235/487; 235/495
[58] Field of Search .............. 235/487, 462, 472, 383, 235/385, 495; 340/146.3 B, 146.3 SY, 146.3 K, 149 A; 250/568, 569; 35/35 R, 35 A

[56] References Cited

U.S. PATENT DOCUMENTS

| 3,238,501 | 3/1966 | Mak et al. | 340/146.3 SY |
|---|---|---|---|
| 3,502,851 | 3/1970 | Kacimoto et al. | 340/146.3 K |
| 3,735,350 | 5/1973 | Lemelson | 340/146.3 SY |
| 3,754,212 | 8/1973 | Borsboom et al. | 340/146.3 B |
| 3,839,625 | 10/1974 | Chadima, Jr. et al. | 235/495 |
| 3,859,632 | 1/1975 | Etter | 235/495 |
| 3,918,029 | 11/1975 | Lemelson | 340/146.3 SY |

Primary Examiner—Daryl W. Cook
Attorney, Agent, or Firm—Pennie & Edmonds

[57] ABSTRACT

A bar code label protection device includes a plate (12) and a bar code label (14), both of which are mounted to an article (10). The plate which protects the label includes a slot (15) dimensioned and configured such that a reading wand (16) may be located to the label to read the bar code. The slot provides a guide for the wand which may be properly and accurately positioned for reading even though there is no visual contact with the label.

6 Claims, 3 Drawing Figures

BAR CODE LABEL PROTECTION DEVICE

TECHNICAL FIELD

The present invention relates to the combination with a bar code label of a device both to protect the bar code label and permit the bar code label to be "read" accurately without visual contact with the bar code label itself.

BACKGROUND ART

Bar code data in the form of spaced bars contrasting with the background on which they are printed, or the like, have been known for many years. Their use became more extensive when code readers or "wands" capable of reading codes with a very high information density became commercially available. The wands generally take the form of a pencil-shaped element having electrical leads extending from the top of a housing and which connect internally with an optical reading head responsive to the information encoded in the pattern. By simply drawing the wand across the surface of the label, the wand detects and decodes the information for display and/or storage.

Bar codes have been utilized on checks and documents, as well as on machinery, equipment, parts and so forth. By means of bar coding, processes of inventory control, production and assembly may be enhanced in efficiency. Also, bar coding may permit organizations to more easily route and keep track of items or articles carrying bar coded data. In order to assure some degree of resistance to damage, it is known that bar code labels may be coated with Mylar, or a thin Mylar film may be applied over the label. Labels with Mylar film, however, are not indestructible. They are subject to scratching, tearing and other forms of accidental or intentional obliteration, which may render the label useless for its intended function. Further, the Mylar film itself may impair accurate reading if the thickness of the film is greater than the depth of field of the optical reading head of the wand.

Apart from the significant possibility of accidental damage to bar code labels, there always exists the possibility of intentional damage. In this situation, a coating of Mylar film will provide little or no protection.

The prior art also includes structures for guiding a wand during movement along the pattern of bars in the accurate reading of bar code data. In general terms, prior art of this type provides such structure to overcome problems theretofore existing when reading large numbers of different types of materials, such as a long list of individual bar codes on labels positioned in adjacent arrangement on a flat sheet or substrate.

Two patents disclosing structures for this purpose are U.S. Pat. Nos. 3,839,625 to G. E. Chadima, Jr. et al. and 3,859,632 to G. Etter. These patents disclose substantially identical structure for guiding the wand. Thus, the Etter patent includes a support which may be a guide layer having a plurality of apertures with guiding edges and a second guide layer of like design over and attached along an external edge to the support. The guide layers form a template such that code data, at a predetermined location on a document precisely located between the layers, may be read. In reading, the wand is guided by the apertures and particularly the guiding edges. The patents recite that the guiding edges overcome problems resulting from a lack of scanning precision.

Another example of the prior art which may be likened to the Etter and Chadima, Jr. et al. patents is U.S. Pat. No. 3,735,350 to J. H. Lemelson. Lemelson describes apparatus for reading coded information which may be associated with printed characters and structure for guiding the reading instrument along the code. The structure may be a ridge or groove in a substrate, or a straight-edge which is manually moved to and accurately positioned at a location for reading a desired code.

The patent to S. M. F. Mak et al., U.S. Pat. No. 3,238,501, discloses a guide for a reading instrument which, like the Lemelson teaching, is manually moved to and accurately positioned at a location for reading.

Each of the Etter, Chadima, Jr. et al., Mak et al. and Lemelson patents relate to the guiding of a reading instrument in the accurate reading of coded information, but these patents all suffer from the problem and disadvantage of having no protection for the coded data on either a label or substrate, and they all require visual contact with the coded data in reading.

Accordingly, the present invention relates to the combination of a substrate containing bar coded information and a protective device which provides protection against damage when mounted over the coding and, importantly, enables an operator to correctly read the coded data without the requirement of visual contact with the data.

DISCLOSURE OF INVENTION

According to the invention, a device in the form of a plate forming a protective barrier is arranged over the bar coded data, which may be located e.g. on a label. The plate and the label carrying the coded data, for purposes as described, are adapted to be secured to an article. As an important aspect of the invention, the plate includes a slot which is of a size and configuration to permit reading of the total content of information carried by the label. The slot provides a support or guide in the movement of a wand for correct reading of the data irrespective of the physical location of the plate and label on the article and whether or not there is eye contact with the label.

The structure, thus performs several significant functions: it permits the use of bar code in a manner such that the likelihood of accidental damage to the bar code is substantially reduced; and it both provides and enables economical protection for a bar code label against intentional damage. This result accrues because the structure of the invention may be secured to a remote or obscure location on the article, a location difficult or impossible to see, yet because of the slot, correct reading of the coded information is possible irrespective of whether or not the code may be seen.

BRIEF DESCRIPTION OF THE DRAWINGS

A preferred embodiment of the invention is disclosed as follows with reference to the drawings wherein.

BEST MODE FOR CARRYING OUT THE INVENTION

According to a preferred embodiment of the invention, an article 10 (see FIG. 1) is provided with a readable code for the purpose, among possible other purposes, of inventory control. The article is illustrated as a packing carton, but it should be apparent from the context of this disclosure that the article may be from any particular class or style of goods, such as a machine, a dish, piece of furniture or some other relatively large object to be coded.

Figure 1:
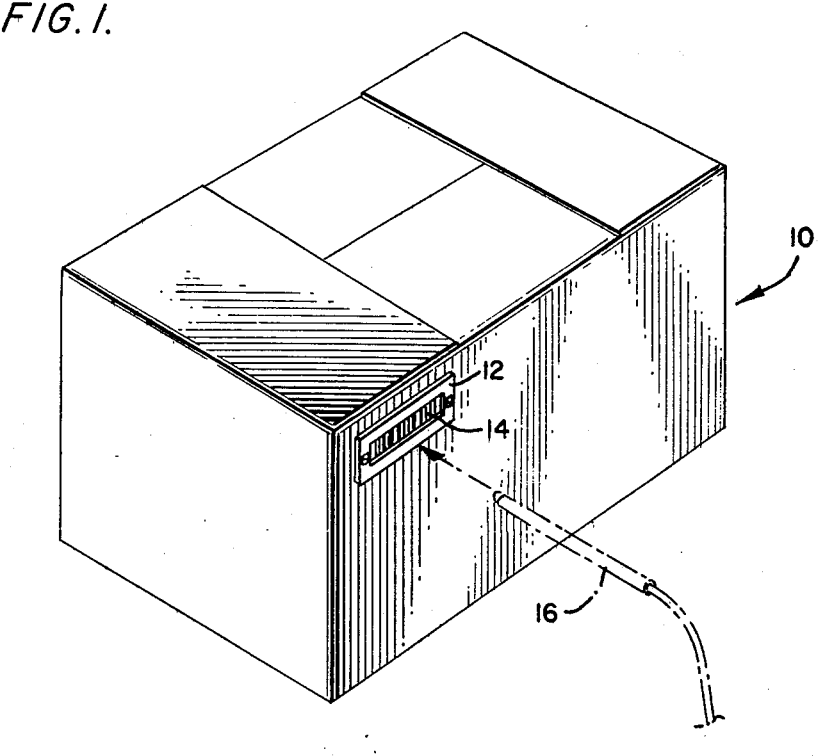
FIG. 1 is a perspective view of an article carrying the bar code label protection device.
Figure 2:
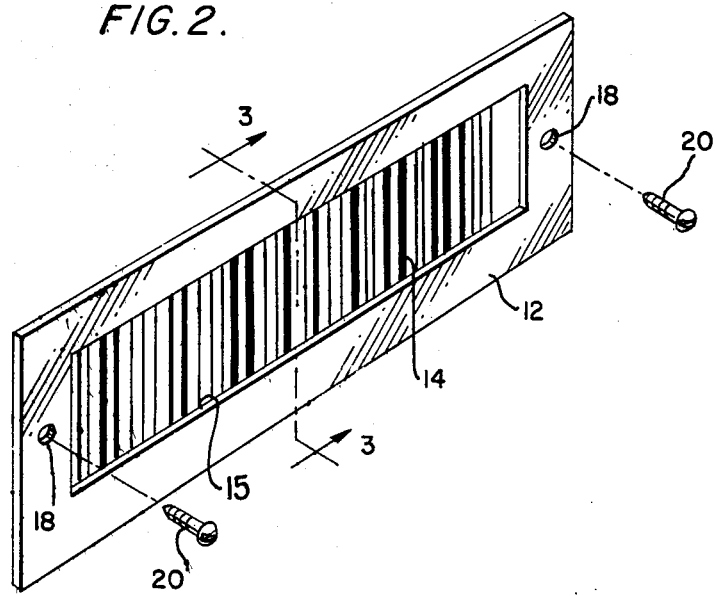
FIG. 2 is an enlarged perspective view of the bar code label and protection device.

FIGS. 1 and 2 illustrate the coding as so-called "bar coding" formed by both dark and light colored bars, either of the same or different thickness throughout the code pattern from left to right. As is well known, the pattern of the several bars represents a particular sequence of alpha-numeric characters to be read by a reading implement or wand 16, also well known in the art.

The coding may be applied directly to the article or it may be applied to a label 14 which then is secured to the article by an adhesive or its equivalent. According to the invention, a protection device in the form of a plate 12 then is secured to the article in superimposed relation to the label.

The specifics of the wand and bar coding, per se, are outside of the scope of this invention and may be considered as conventional.

The plate 12 is in the form of a frame including an elongated slot 15 both dimensioned and configured so as not to mask the code bars throughout their length or along the pattern on the label. The plate may be formed of any material, such as metal, or it may be fabricated either of an opaque or transparent plastic, or of a ceramic material, as choice may dictate in the realization of certain operative requirements. Among these requirements are those of strength, thereby to provide a protective barrier around the coding; resistance to damage either intentional and otherwise to provide long life; light weight, even when fabricated in a thickness substantially greater than that of the label so as not to overly increase the weight of the article to which it is attached; and a ready capability of such attachment.

The slot 15, further, is of a width so that the wand 16 may be received for reading the bar code. Without any intent to limit the invention, the width of the slot may be between about 10 to 100 mils. A slot dimension near the lower limit is sufficient for purposes of reading the bar code with a number of presently available wands, whereas a widening of the slot within the range of the upper limit has been found to permit use of all presently available wands. A further advantage to an increase in the dimension of the slot is that the wand, positioned therein for reading, will not always traverse the same path, which may result in undue wear to the label, or to its protective coating, impairing its readability.

In accordance with the invention, a protective layer (not shown) is preferably provided over the label. Such a protective layer may be supported within the slot or it may be separate from the plate to compromise a layer between the plate and label. The thickness of the protective layer necessarily will be limited to the depth of field of the optical reading element of the wand. Typically, the thickness of such a layer will be maintained to no more than about 7 to 10 mils.

FIG. 2 is illustrative of one manner of mounting the plate to an article for support of the label and the protective shield, if employed as a separate layer therebehind. To this end, the plate is provided with two or more holes 18 in spaced relation for receipt of screws 20 to be threaded into the article. Each hole 18 may be counterbored or beveled at the upper end, for example, thereby to receive the head of screw 20 below the plane of the surface of plate 12. Alternative methods and means of mounting the plate 12 and the label 14 may be resorted to, as well. Thus, the structure may be mounted by the use of an adhesive, a rivet and the like.

Figure 3:
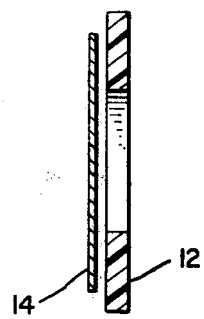
FIG. 3 is an enlarged cross-sectional view as seen along line 3—3 of FIG. 2 with the bar code label slightly spaced from the protection device.

FIG. 3 illustrates the profile of plate 12 which enhances the overall utility of the present invention. Thus, the frame portion of the plate positively locates the label with respect to the slot 15, and the depth of the slot provides a surface along which the wand may be supported in passing along the label to correctly read the encoded information. The plate and the depth of the slot, further, provide a protective barrier to the surface of the label thereby to substantially reduce the chance of the label being accidentally damaged by foreign substances. As seen, the frame portion of the plate extends only slightly beyond the outer perimeter of the label so that the plate does not overly increase the area of the article to be covered.

All in all, plate 12 permits the realization of at least two important aspects of the present invention as well as overcoming problems and disadvantages of the prior art. Firstly, the plate provides a protective barrier around and substantially over the label 14 containing encoded information. The barrier exists irrespective of the physical location of the plate on the article to which it is secured. In this fashion, the plate can reduce or substantially eliminate the possibility of the label being damaged accidentally.

Often times, however, the label may be subject to intentional damage. In this case, the presence or absence of the plate would have little affect. To overcome or at least reduce this type of occurrence, both the plate the label may be secured to the article in a remote or obscure location. While locating the plate and label in the remote or obscure location decreases the likelihood of detection, and hence of intentional damage, such location of the plate and label usually makes it awkward or impossible to see the label in order to assure correct placement and movement of the wand in reading the encoded information. Importantly, the plate and particularly slot 15 provides another advantage in that the slot serves as a locator for wand 16 for movement along the bar code at a proper angle or attitude relative to the label thereby to read correctly the encoded information. Thus, the raised plate permits locating the label, by feel, and the slot of the plate permits nonvisual wand alignment and, once located, the slot guides movement of the wand. It has been found that a slot having depth of about 1/16 inch prevents escape of the wand, when drawn across the label, from the slot. Reading of the encoded information may thus be done "blind", i.e., without the operator being able to see the label directly.

It will be readily apparent to those skilled in the art that a wide variety of variations may be made in the present apparatus and process without departing from practice of the invention disclosed herein.

I claim:

1. A device for protection of bar code information comprising
   (a) a label containing bar code information; and (b) a plate adapted to mount said label to an article so that said plate is disposed completely over said label, said plate including
  (1) a single slot dimensioned and configured to frame said bar code information and provide a guide surface whereby a reading instrument without the necessity of visual contact with said label may be located to said slot for movement along any of a plurality of paths in the accurate reading of said information.

2. The protective device of claim 1 wherein said slot is rectangular with said guide surface extending along said bar code information.

3. The protective device of claim 1 or 2 wherein said plate is of a thickness thereby to retain said reading instrument within said slot during movement in reading.

4. The protective device of claim 3 wherein said plate is of a thickness of about 1/16 inch.

5. The protective device of claim 3 wherein said slot has a width of between 10 mils and 100 mils.

6. A method of identifying an article with a bar code label such that the label is resistant to accidental or intentional obliteration, comprising:
  (a) combining with a bar code label containing bar code information on its surface, a plate disposed to essentially completely cover the label and having a single slot extending longitudinally therein to expose the label along the entire length of the bar code information thereon for reading by a reading instrument, such slot being dimensioned and configured to frame the bar code information and to provide a guide surface to locate such reading instrument and guide the movement of such reading instrument along any of a plurality of paths without the necessity of visual contact with the label; and
  (b) mounting said label and plate to such article at a location thereon not readily visible or discernable to the human eye, whereby the label is not susceptible to accidental damage and is not readily discernable by one wanting to inflict intentional damage thereon.

* * * * *